US 6,680,816 B2

(12) United States Patent
Matsui et al.

(10) Patent No.: US 6,680,816 B2
(45) Date of Patent: Jan. 20, 2004

(54) AUDIO/CONTROL HEAD AND METHOD OF ASSEMBLING CORES OF THE HEAD

(75) Inventors: Kiyoshi Matsui, Koide-machi (JP); Atsushi Shibata, Nara (JP)

(73) Assignee: Funai Electric Co., Ltd., Osaka (JP)

( * ) Notice: Subject to any disclaimer, the term of this patent is extended or adjusted under 35 U.S.C. 154(b) by 274 days.

(21) Appl. No.: 09/841,685

(22) Filed: Apr. 23, 2001

(65) Prior Publication Data

US 2002/0008935 A1 Jan. 24, 2002

(30) Foreign Application Priority Data

Apr. 25, 2000 (JP) .................................. 2000-123994

(51) Int. Cl.$^7$ ............................................. G11B 5/105
(52) U.S. Cl. .............................................. 360/129
(58) Field of Search .............................. 360/129, 128

(56) References Cited

U.S. PATENT DOCUMENTS 3,936,884 A * 2/1976 Hogan ....................... 360/125

5,930,081 A * 7/1999 Ishizawa et al. ............ 360/125

FOREIGN PATENT DOCUMENTS

| JP | 59-160810 | * | 9/1984 |
| JP | 2001-118208 | * | 4/2001 |

* cited by examiner

Primary Examiner—Brian E. Miller
(74) Attorney, Agent, or Firm—Seed IP Law Group PLLC (57) ABSTRACT

An audio/control head for used in a Video Cassette Recorder or the like has a core holder 11 arranged to include positioning portions 24 and 25 for determining the pitch length P1 and pressing tabs 23 having an elasticity for pressing inwardly cores members 15 and 17 against the positioning portions 24 and 25 from the outer side. As the cores members 15 and 17 are held directly on the positioning portions 24 and 25, they are inwardly pressed by the pressing tabs 23. Then, the core pitch p1 is precisely determined between the audio core and the control core without using a particular jig during the assembly. The overall number of jigs required for mounting the cores to the core holder can be reduced. Also, the core pitch P1 can be improved in the accuracy and the characteristics of the head will be consistent.

5 Claims, 9 Drawing Sheets

AUDIO/CONTROL HEAD AND METHOD OF ASSEMBLING CORES OF THE HEAD

BACKGROUND OF THE INVENTION

The present invention relates to an audio/control head provided in a video recorder apparatus such as a VCR (Video Cassette Recorder) or VTR (Video Tape Recorder) and a method of assembling cores of the audio/control head.

Conventionally, a magnetic head provided in a video recorder apparatus such as a VCR employs an audio/control head (referred to as an A/C head hereinafter) which comprises two cores mounted in a sealed case, an audio core for recording and playing back audio signals and a control core for recording and playing back control signals. It is essential in such a video recorder apparatus that the two cores are precisely mounted on a core holder with a pitch length therebetween (referred to as a core pitch) held constant along a direction perpendicular to the tape transfer direction for accurately playing back the audio signals and control signals recorded by another video recorder apparatus.

Figure 8:
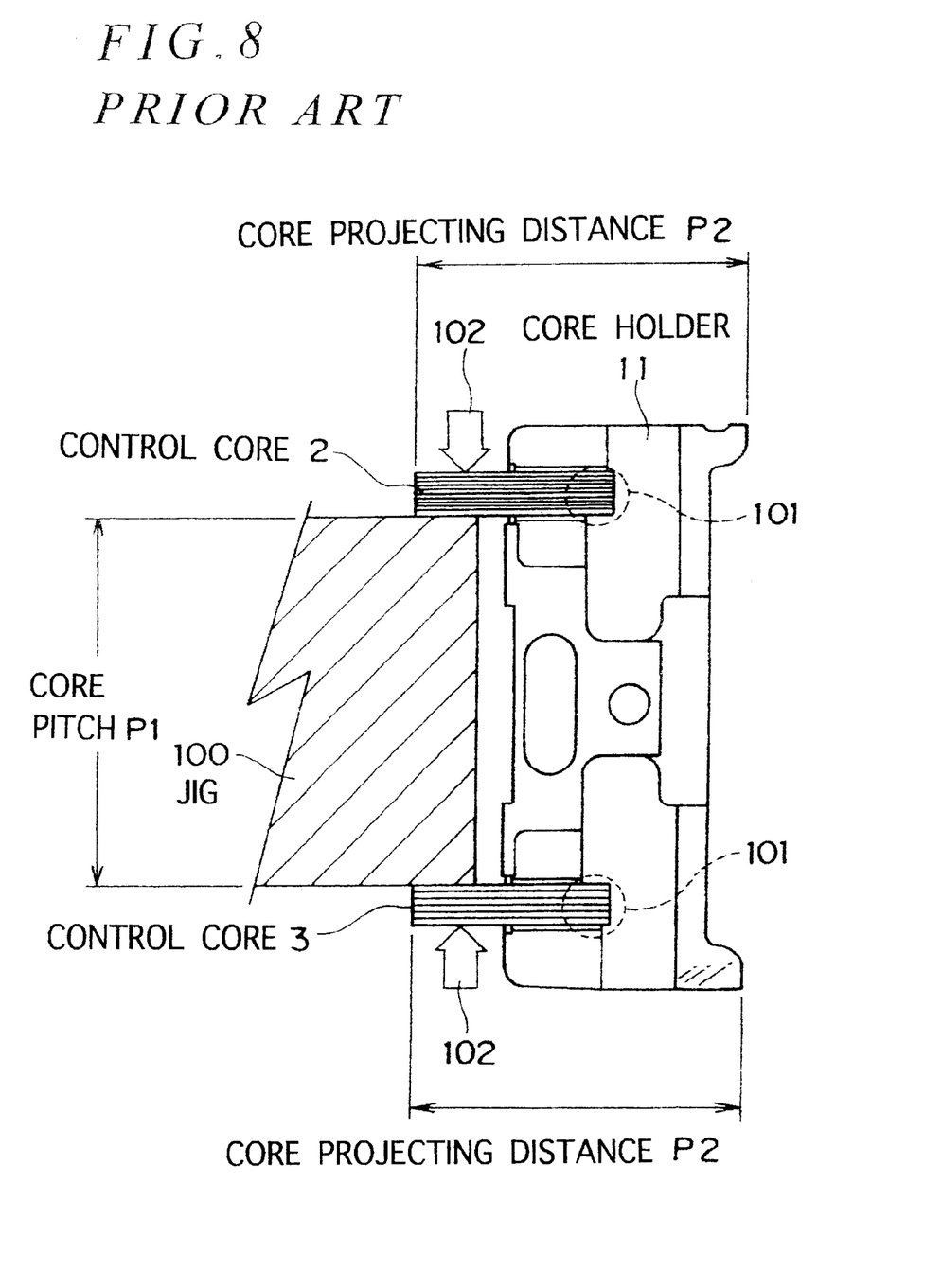
FIG. 8 is an explanatory view showing a method of assembling cores in a conventional head.
Figure 9:
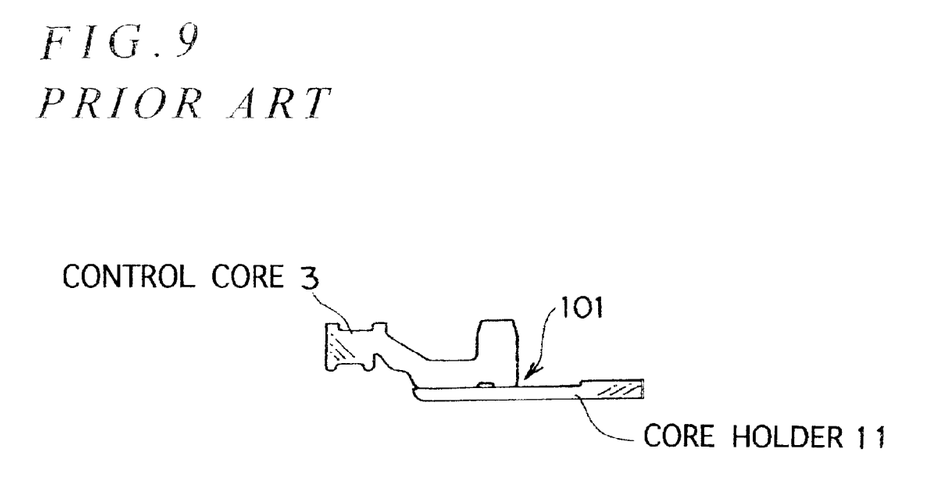
FIG. 9 is a bottom view of a core holder with the cores assembled in the conventional head.

FIGS. 8 and 9 illustrate a conventional method of mounting the two cores on the core holder in an A/C head. As shown in FIGS. 8 and 9, the conventional method of mounting the two cores comprises the steps of pressing the two, audio and control, cores 2, 3 and a jig 100, which is sandwiched between the two cores for determining a core pitch P1, together inwardly from the outside using another jig 102, applying an adhesive material 101 to between the two cores 2, 3 and the core holder 11, and dried out together with the jigs in a drying furnace. This allows the two cores 2 and 3 to remain spaced by the core pitch P1 as having been mounted. It is also necessary for mounting the two cores 2 and 3 to have the core projecting distance P2 held at a constant value as shown in FIG. 8. For the purpose, the two cores 2 and 3 are mounted with the core projecting distance P2 held constant using a further positioning jig.

A modified method of mounting magnetic cores in such an apparatus is disclosed in Japanese Utility-model Laid Open Publication (HEI)2-89604, where as the magnetic cores are positioned in a set of molds, a core holder is cast so that the two cores are mounted to the core holder with the use of no adhesive.

Another modified method is disclosed in Japanese Utility-model Laid Open Publication (HEI)5-21682, where a pair of members which incorporate two magnetic cores respectively in an A/C head are sandwiched between specifically configured set springs to inhibit positional discrepancy between the paired members. Moreover, a further modified method is disclosed in Japanese Utility-model Laid Open Publication (SHO)58-144614 where a record/playback head in an A/C head has holes provided therein for ease of mounting an audio erase head thereto.

However, the conventional apparatus employing the jigs for determining the core pitch has some drawbacks that the jigs are too many to be dried at the drying step, that the jigs may hardly be uniform in the dimensions, and that the jigs may easily be declined in the dimensions when worn out or applied with adhesive, hence failing to maintain the core pitch constant. Any arrangement disclosed in Japanese Utility-model Laid Open Publication (HEI)2-89604, (HEI) 5-21682, or (SHO)58-144614 is impossible to reduce the number of the jigs for determining the core pitch.

SUMMARY OF THE INVENTION

The present invention has been developed for eliminating the foregoing drawbacks and its object is to provide an audio/control head which can determine the core pitch without using any jig in the assembly of cores, thus reducing the number of jigs required. Also, the core pitch can be increased in the accuracy, hence ensuring the stable characteristics of the head.

As a feature of the present invention for achievement of the object, an audio/control head is provided comprising an audio core for recording and playing back audio signals, a control core for recording and playing back control signals, and a core holder for holding the cores, the audio core and the control cores spaced from each other by a predetermined pitch length along a direction perpendicular to the direction of tape transfer and having distal end surfaces thereof arranged to be a tape contact surfaces so that the audio signals and the control signals can be recorded and played back on a tape, wherein the core holder includes, positioning portions for determining the pitch length between the two cores along the direction perpendicular to the direction of tape transfer and, pressing portions having an elasticity for pressing inwardly the cores against the positioning portions from the outer side of the perpendicular direction.

As the core members are held directly on the positioning portions of the core holder, they are pressed against the positioning portions by the pressing tabs in the above arrangement. Accordingly, the pitch length or core pitch between the two cores can be determined along the direction perpendicular to the direction of tape transfer, with no use of a specific jig. The number of jigs required for assembling the cores will be reduced. Also, the effect of variations or faults in the dimensions of the jigs will be minimized thus enhancing the accuracy of the core pitch.

It may be desired that while the core holder is formed by molding a resin material or by punching a pattern, its positioning portions are at least two spaced from each other along the depthwise direction inwardly of the distal ends of the cores and its pressing portions are located between the two positioning portions along the depthwise direction of the cores. While the cores are positioned and held with the at least two positioning portions and the pressing portions of the core colder, they are pressed by the pressing portions between the two positioning portions along their depthwise direction. This can inhibit the cores from tilting or dislocating.

According to a feature of the present invention, a method of assembling cores of an audio/control head which comprises an audio core for recording and playing back audio signals, a control core for recording and playing back control signals, and a core holder for holding the cores, the audio core and the control cores spaced from each other by a predetermined pitch length along a direction perpendicular to the direction of tape transfer and having distal end surfaces thereof arranged to be a tape contact surfaces so that the audio signals and the control signals can be recorded and played back on a tape, is provided comprising the steps of: preparing the core holder which includes positioning portions for determining the pitch length between the two cores along the direction perpendicular to the direction of tape transfer and pressing portions having an elasticity for pressing inwardly the cores against the positioning portions from the outer side of the perpendicular direction; holding the cores on the core holder; and drying together the cores and the core holder between which films of adhesive are applied.

In the method, the cores are securely held with the positioning portions and the pressing portions of the core holder so that its position can be determined along the direction perpendicular to the direction of tape transfer. The adhesive applied between the cores and the core holders held in the position is then dried. Accordingly, the cores can be mounted to the core holder without using any specific jig. As a result, the same effect as of the apparatus will be achieved.

PREFERRED EMBODIMENT OF THE INVENTION

Figure 1:
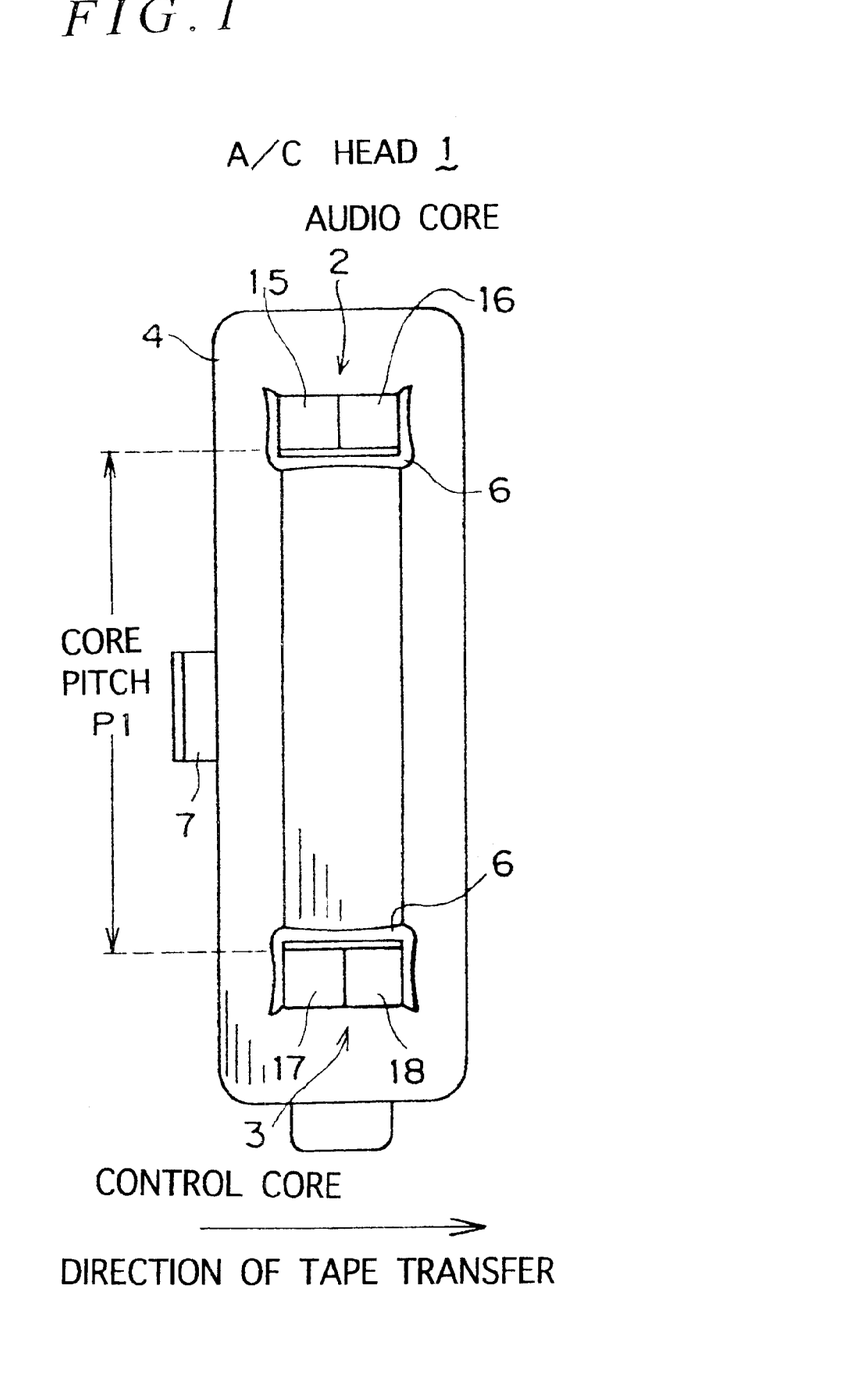
FIG. 1 is a front view of an audio/control head according to one embodiment of the present invention.
Figure 2:
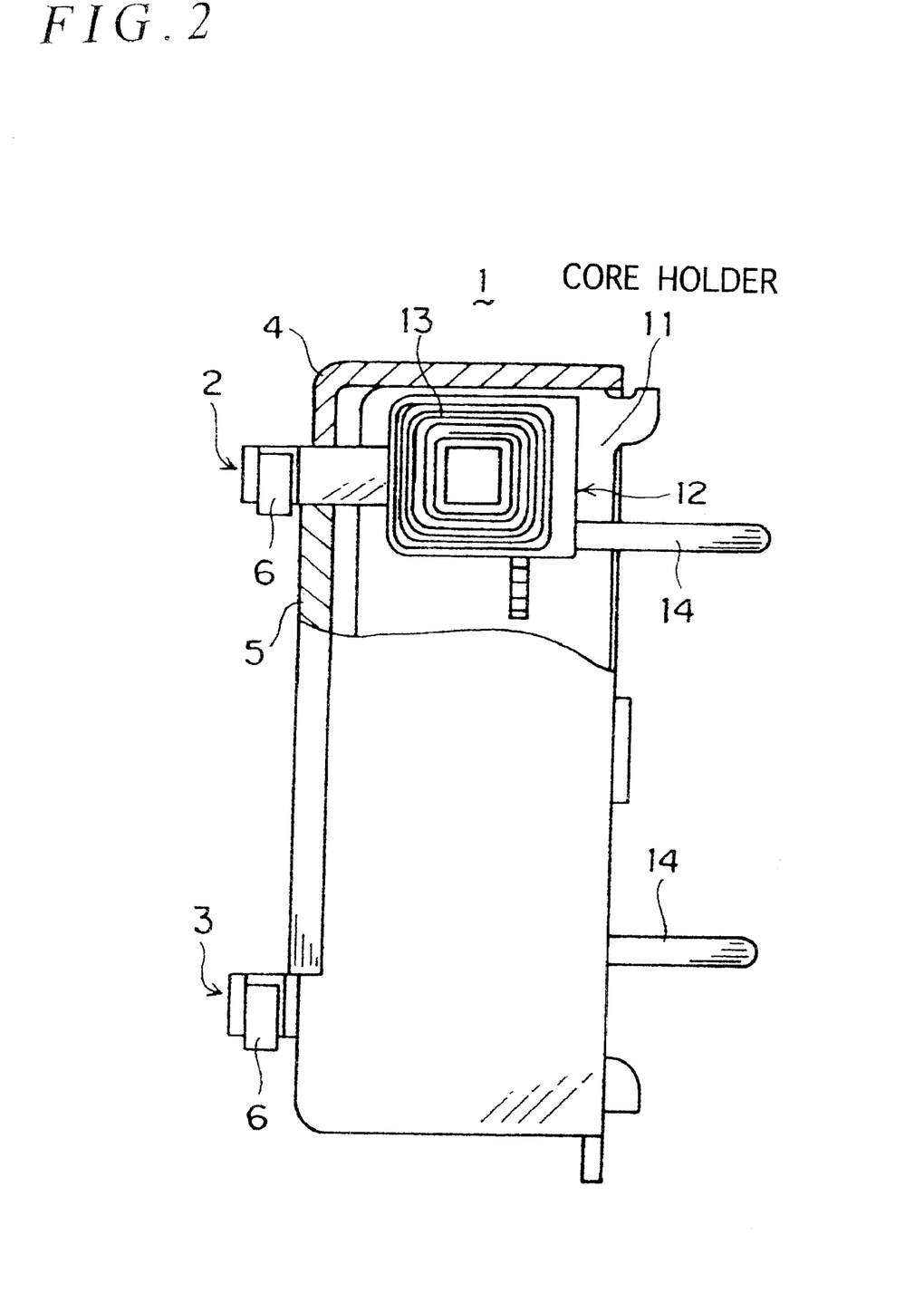
FIG. 2 is a partially cut-off side view of the head.
Figure 3:
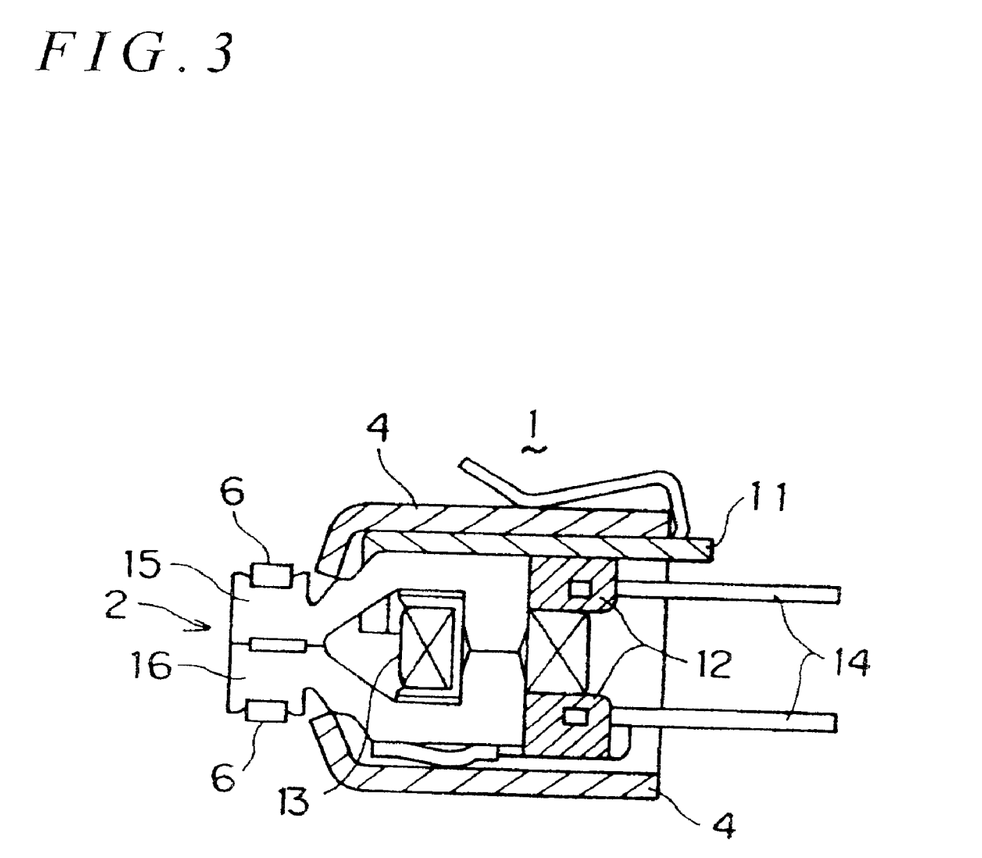
FIG. 3 is a cross sectional view of the head.

An audio/control head of one embodiment of the present invention will be described referring to the relevant drawings. FIGS. 1 to 3 schematically illustrate an arrangement of the audio/control head (referred to as the A/C head hereinafter) of the embodiment. The A/C head denoted by 1 is mounted in a VCR (video cassette recorder) for recording and playing back audio signals and control signals and generally comprises an audio core 2 for recording and playing back the audio signals and a control core 3 for recording and playing back the control signals. The two cores 2 and 3 are mounted to a core holder 11 and accommodated in a shield case 4. The two cores 2 and 3 are exposed at their distal end from openings of the shield case 4 for providing tape contact surfaces. A dummy plate 5 is provided between the two cores 2 and 3 on the front side of the head. The distance P1 (referred to as a core pitch P1 hereinafter) between the two cores 2 and 3 perpendicular to the direction of tape transfer is set to a constant length for allowing the audio signals and the control signals recorded by one VCR to be able to be precisely played back on another VCR. The audio core 2 comprises a pair of core members 15 and 16. In assembly, one core 15 is first mounted and then the other core 16 is mounted on the core holder 11. More specifically, the other core 16 is mounted so as to overlap the core 15.

The control core 3 comprises a pair of core members 17 and 18 which are assembled in the same manner as of the audio core 2. The audio core members 15, 16 and the control core members 17, 18 are held together at their distal end with a couple of set springs 6 respectively. The audio core 2 is mounted on the core holder 11 and joined with a spool 12. The spool 12 has a coil 13 wound thereon and is joined to a terminal pin 14. The control core 3 is identical in the arrangement to the audio core 2.

A method of mounting the audio core 2 and the control core 3 to the core holder 11 is now explained referring to FIGS. 4 to 7. The core holder 11 is formed by molding a resin material and includes a holder side portion 24 and a screen portion 25 (positioning portions) for determining the core pitch P1 and elastic pressing tabs 23 for inwardly pressing the positioning portions from the lengthwise direction of the core pitch P1. For mounting the audio core 2 and the control core 3 to the core holder 11, the core members 15 and 17 are held directly on the holder side portion 24 and the screen portion 25 and then pressed against the holder side portion 24 and the screen portion 25 with the pressing tabs 23 in the directions denoted by A and B so that the core pitch P1 is determined.

Figure 4:
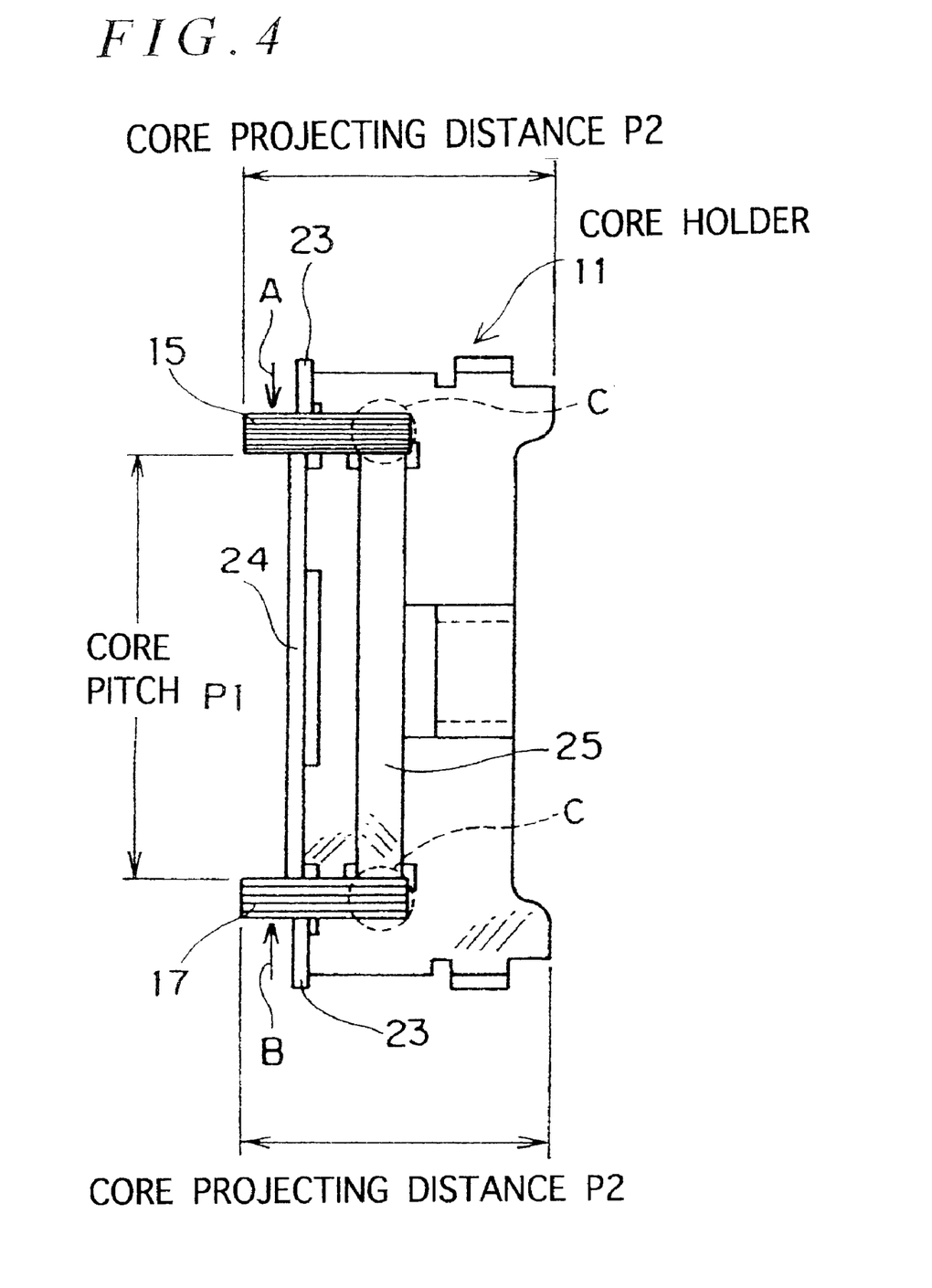
FIG. 4 is a side view of a core holder with cores assembled.
Figure 5:
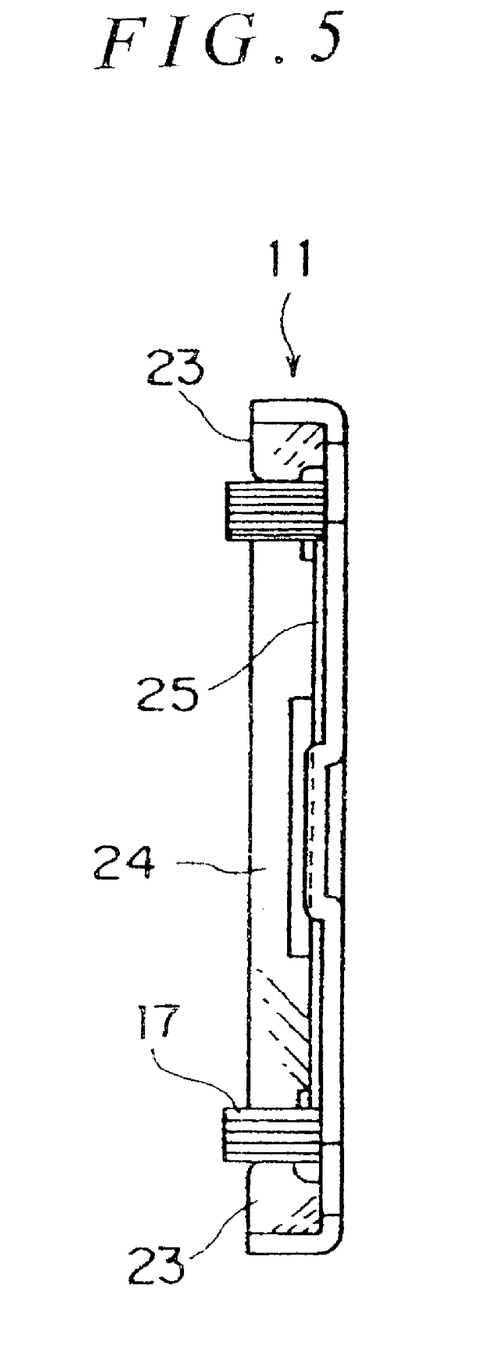
FIG. 5 is a front view of the core holder with the cores assembled.
Figure 6:
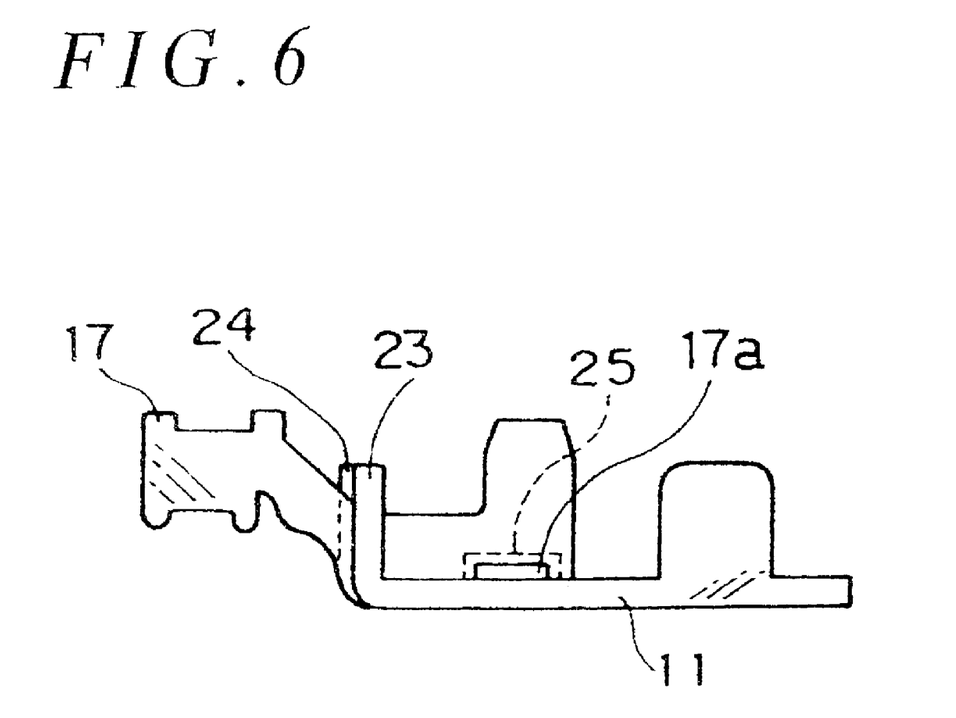
FIG. 6 is a bottom view of the core holder with the cores assembled.

The holder side portion 24 and the screen portion 25 are spaced from each other along the depthwise direction inwardly of the distal ends of the core members 15 and 17. The pressing tabs 23 are positioned between the holder side portion 24 and the screen portion 25 along the depthwise direction of the core members 15 and 17. As a result, the pressing tabs 23 press the core members 15 and 17 at the locations along the depthwise direction between the holder side portion 24 and the screen portion 25. This can inhibit the core members 15 and 17 from tilting or dislocating.

Also, a core projecting distance P2 which is critical for determining the characteristics of the A/C head 1 is determined using an unshown jig. Then, a film of adhesive is applied to a recess 17a (a region denoted by C in FIG. 4) of the core member 17 as best shown in FIG. 6. As the unshown jig for determining the core projecting distance P2 has been removed, the core holder 11 assembled with the core members 15 and 17 are placed in a furnace for drying the adhesive. This method of mounting the cores to the core holder requires no jig carried in the furnace. As the core holder 11 mounting the core members 15 and 17 are placed in the furnace, a less number of jigs can be used.

Figure 7:
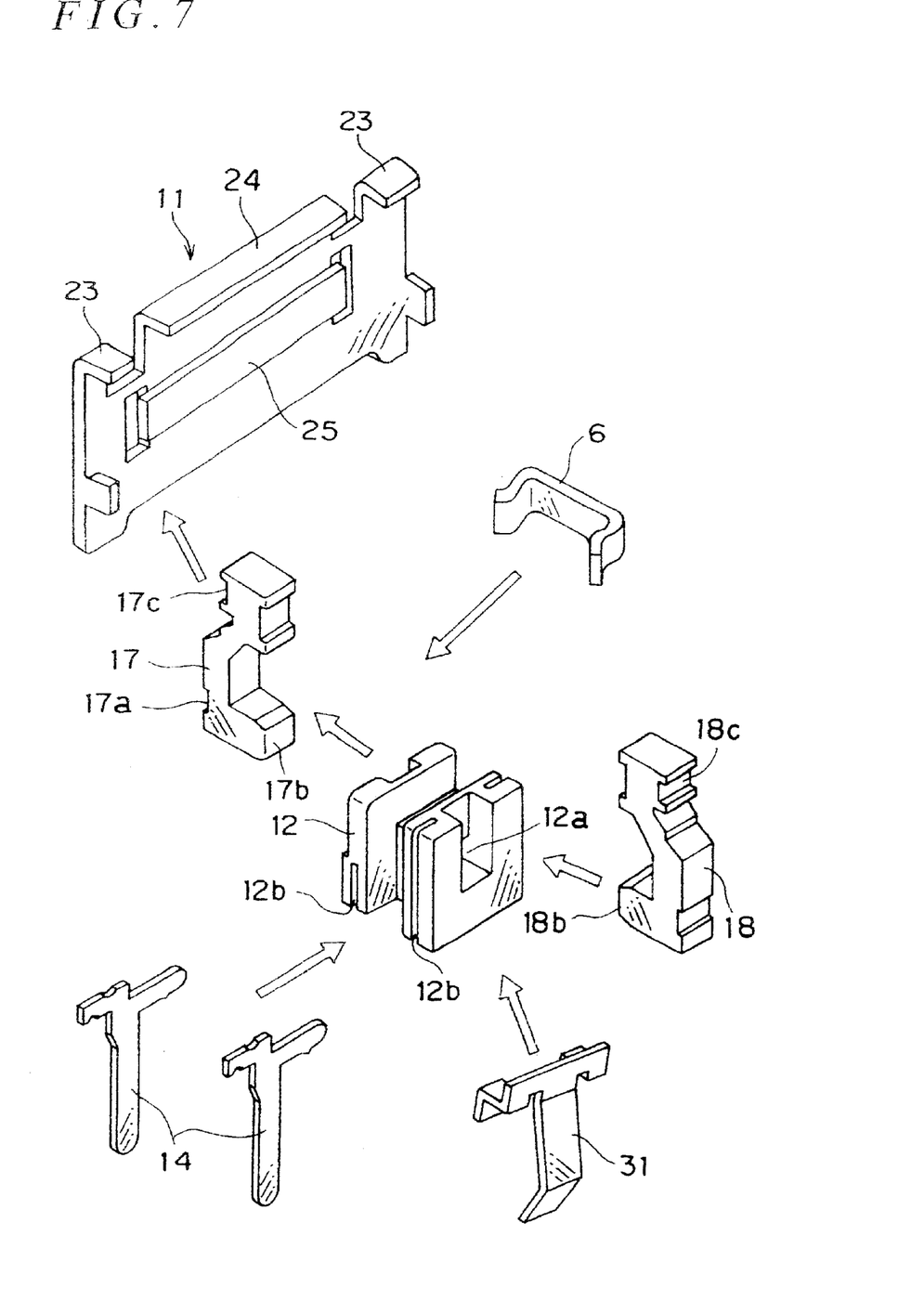
FIG. 7 is an exploded perspective view showing an overall assembly of the head.

The arrangement of the head is now explained in more detail referring to FIG. 7, where the control core 3 only is illustrated for simplification. As the core member 17 has been mounted to the core holder 11 by the above described method, the core member 17 is fitted at its projection 17b into a through hole 12a provided in a central region of the spool 12 and thus joined with the spool 12. Then, the core member 18 is fitted at its projection 18b into the through hole 12a of the spool 12 and the set spring 6 is used for holding together the core member 17 at its recess 17c and the core member 18 at its recess 18c. The terminal pin 14 is inserted into a slit 12b provided in one side and the bottom of the spool 12 and held together with a case spring 31 mounted from the bottom of the spool 12. The audio core can be assembled in the same manner.

As set forth above, the A/C head 1 of the embodiment has the core holder 11 arranged to include the holder side portion 24 and the screen portion 25 and the positioning portions for determining the core pitch P1 and the pressing tabs 23 for pressing the positioning portions inwardly along the direction of the core pitch. More specifically, as the core members 15 and 17 are held directly on the holder side portion 24, the screen portion 25 and pressed against the holder side portion 24, the screen portion 25 by the pressing tabs 23, the core pitch P1 remains constant without using a particular jig. Accordingly, the total number of jigs used for assembling the A/C head can be reduced. Also, the effect of variations or faults in the dimensions of the positioning jig in the prior art for determining the core pitch will be eliminated. As a result, the A/C head of this embodiment will be improved in the accuracy of the core pitch thus ensuring its characteristics stable.

The present invention is not limited to the embodiment and various modifications and changes may be possible. While the components for determining the core pitch are commonly used for both the audio core 2 and the control core 3 in the embodiment, they may be prepared for each core. Also, as the pressing force is developed by the yielding force of the resin material of the pressing tabs 23 of the core holder 11 formed by resin molding, it may be generated by using the elasticity of a spring or the like.

What is claimed is:

1. An audio/control head comprising an audio core for recording and playing back audio signals, a control core for recording and playing back control signals, and a core holder for holding the cores, the audio core and the control cores spaced from each other by a predetermined pitch length along a perpendicular direction to the direction of tape transfer and having distal end surfaces thereof arranged to be a tape contact surfaces so that the audio signals and the control signals can be recorded and played back on a tape, wherein the core holder includes,
    positioning portions which determine the pitch length between the two cores along the direction perpendicular to the direction of tape transfer, and,
    pressing portions having an elasticity which press the cores inwardly against the positioning portions from the outer side in the perpendicular direction.

2. An audio/control head according to claim 1, wherein the core holder is formed by molding a resin material or by punching a pattern, the positioning portions are at least two spaced from each other along the depthwise direction inwardly of the distal ends of the cores, and, the pressing portions are located between the two positioning portions along the depthwise direction of the cores.

3. An audio/control head according to claim 2, wherein each of the audio core and the control core comprises a pair of core members, either one core among the audio core and the control core is mounted to the core holder.

4. An audio/control head according to claim 3, wherein each of the cores are mounted on the core holder and their assembly is accommodated in a shield case.

5. A method of assembling cores for an audio/control head which comprises an audio core for recording and playing back audio signals, a control core for recording and playing back control signals, and a core holder for holding the cores, the audio core and the control cores spaced from each other by a predetermined pitch length along a direction perpendicular to the direction of tape transfer and having distal end surfaces thereof arranged to be a tape contact surfaces so that the audio signals and the control signals can be recorded and played back on a tape, comprising the steps of:

preparing the core holder which includes positioning portions for determining the pitch length between the two cores along the direction perpendicular to the direction of tape transfer and pressing portions having an elasticity for pressing inwardly the cores against the positioning portions from the outer side in the perpendicular direction;

holding the cores on the core holder; and drying together the cores and the core holder between which films of adhesive are applied.

* * * * *